March 3, 1936.  E. E. NEWTON ET AL  2,032,950
APPARATUS FOR HANDLING STRANDS
Filed Dec. 22, 1932  12 Sheets-Sheet 3

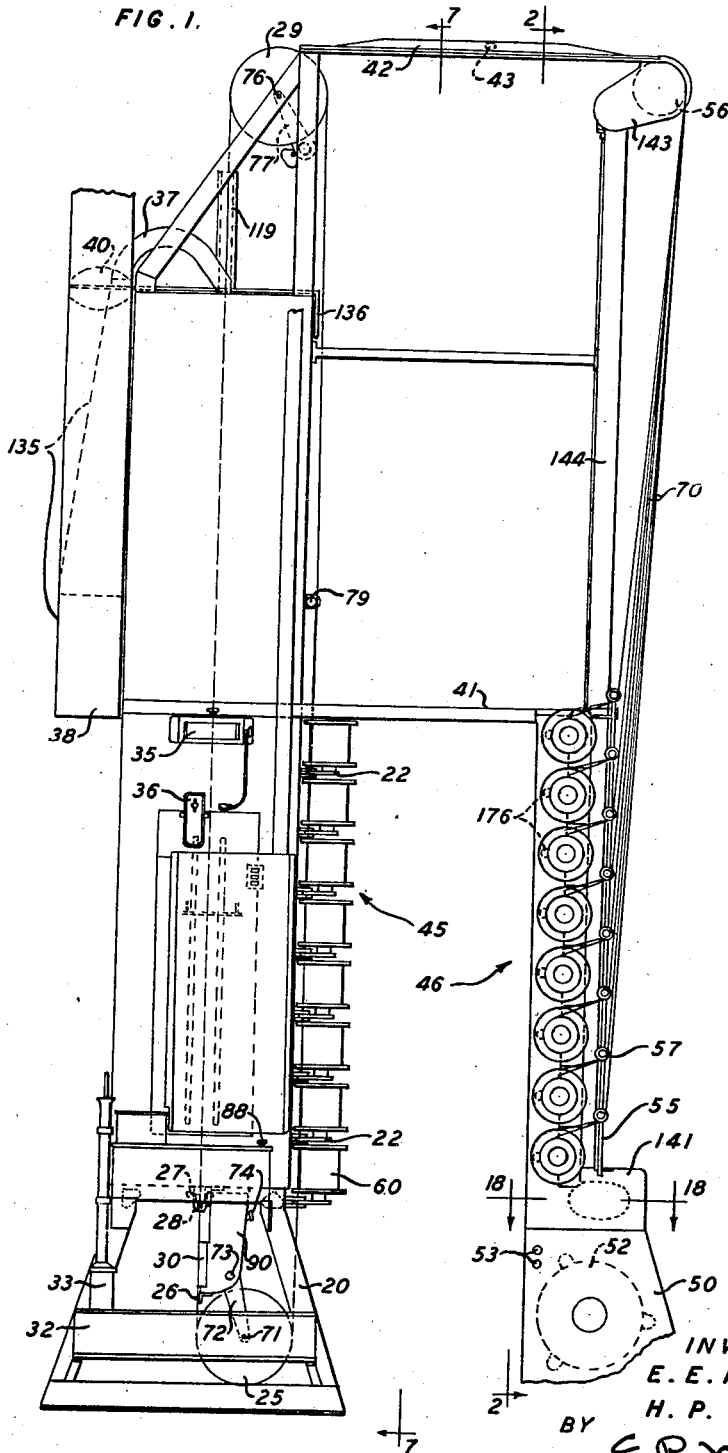

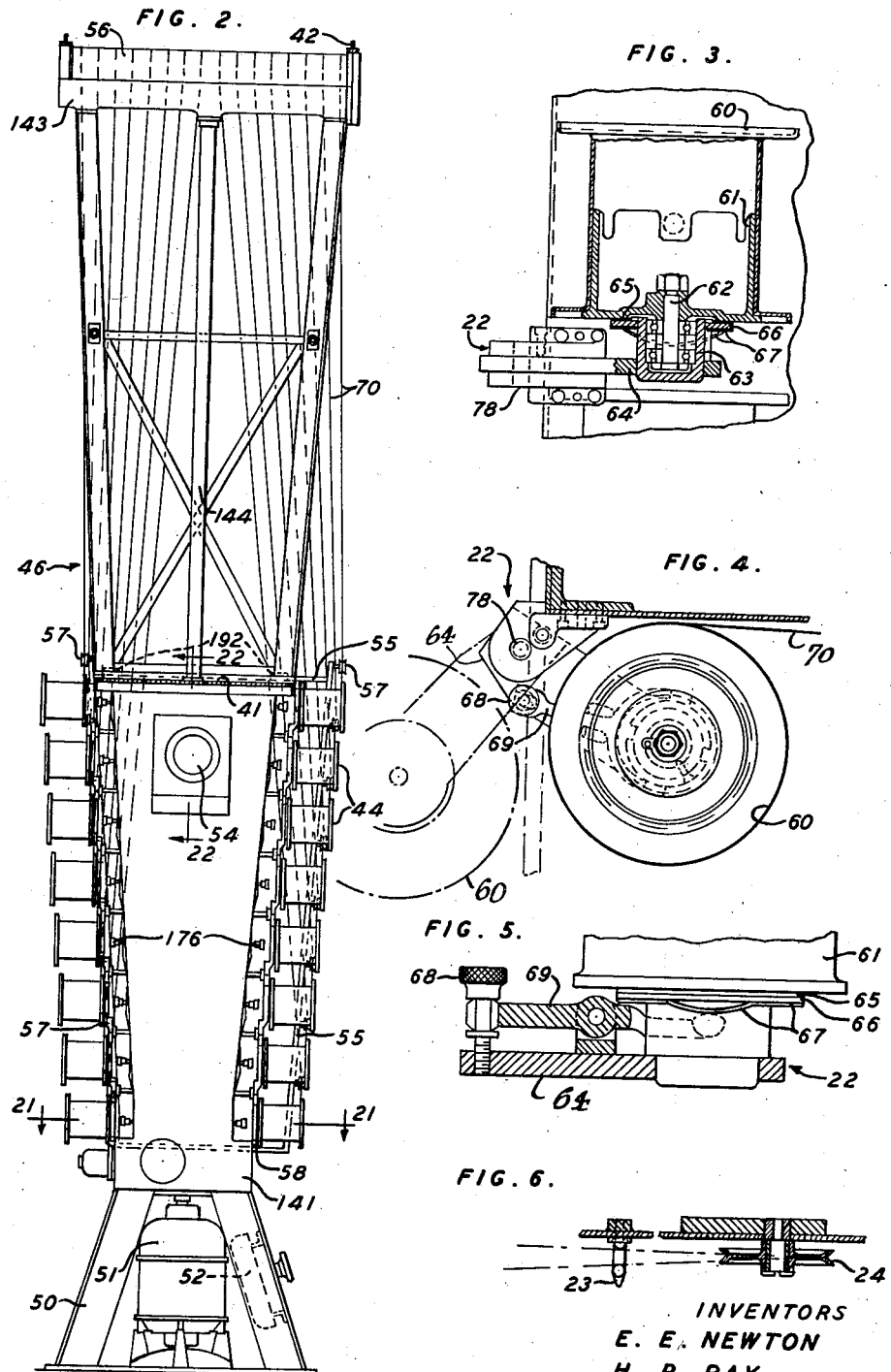

INVENTORS
E. E. NEWTON
H. P. RAY
BY E. R. Nowlan
ATTORNEY

March 3, 1936.  E. E. NEWTON ET AL  2,032,950
APPARATUS FOR HANDLING STRANDS
Filed Dec. 22, 1932  12 Sheets-Sheet 4
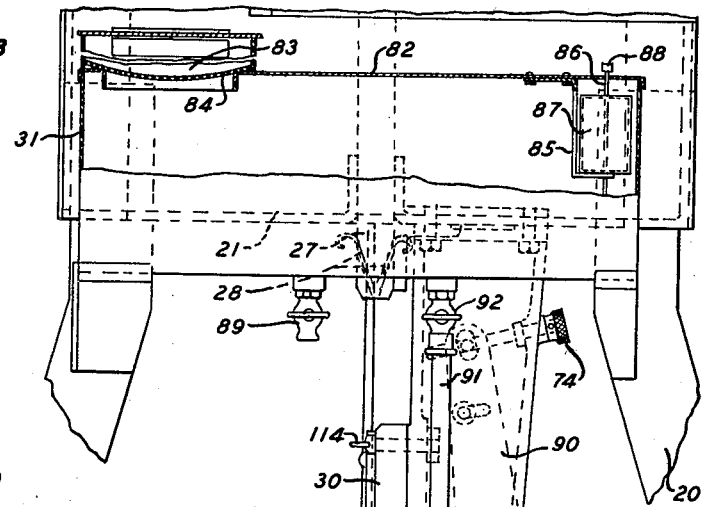
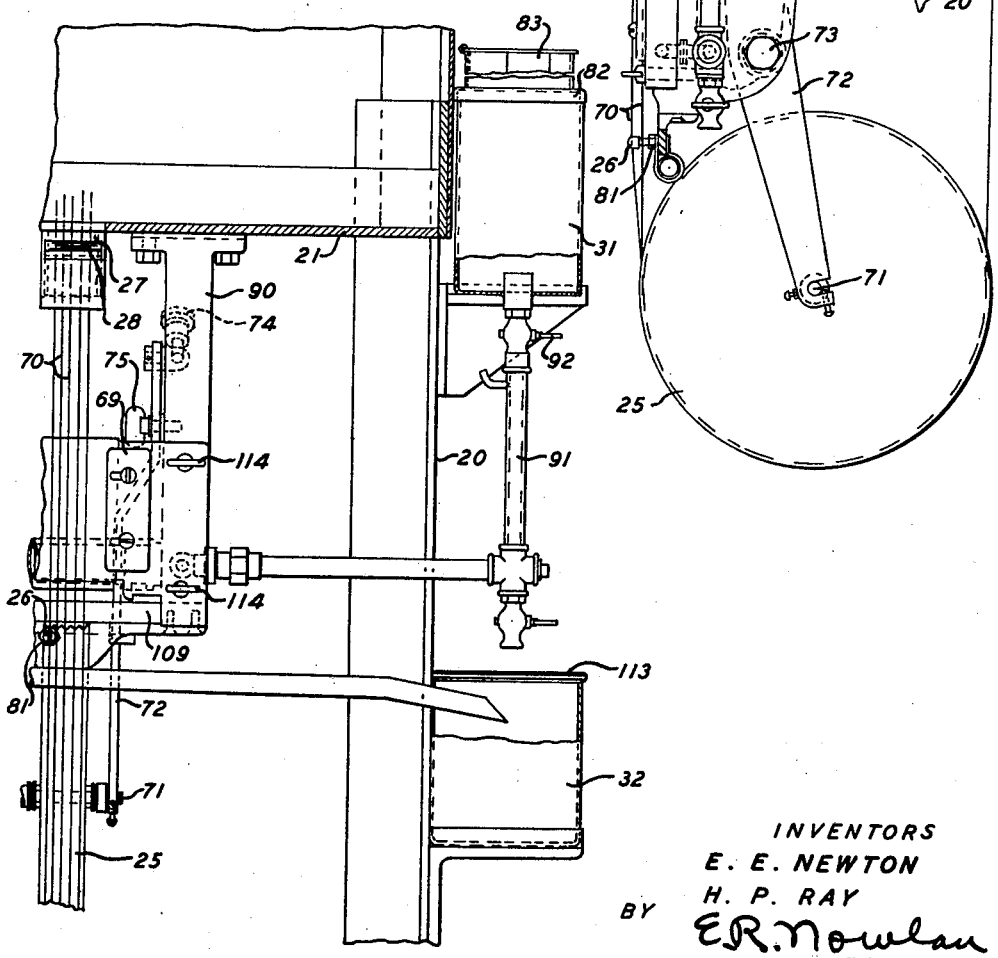
INVENTORS
E. E. NEWTON
H. P. RAY
BY E. R. Nowlan
ATTORNEY March 3, 1936.  E. E. NEWTON ET AL  2,032,950
APPARATUS FOR HANDLING STRANDS
Filed Dec. 22, 1932  12 Sheets-Sheet 5
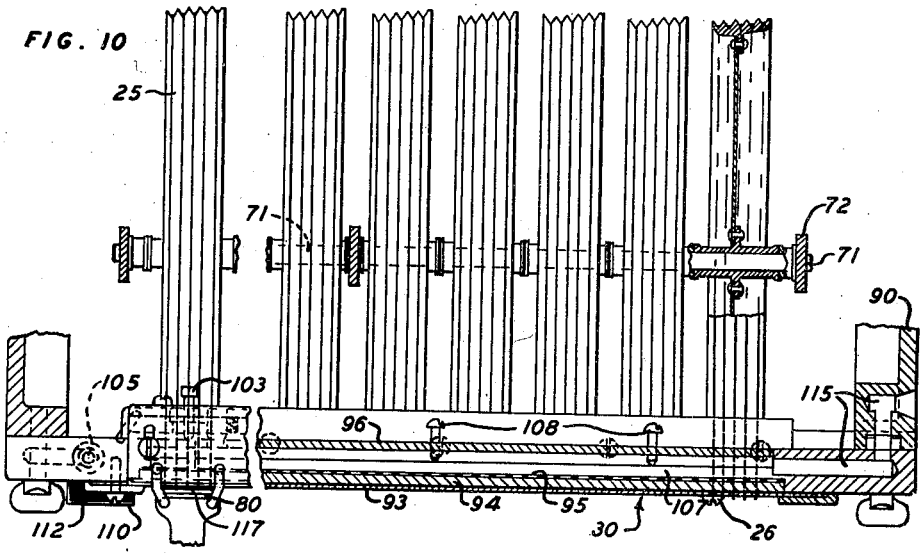
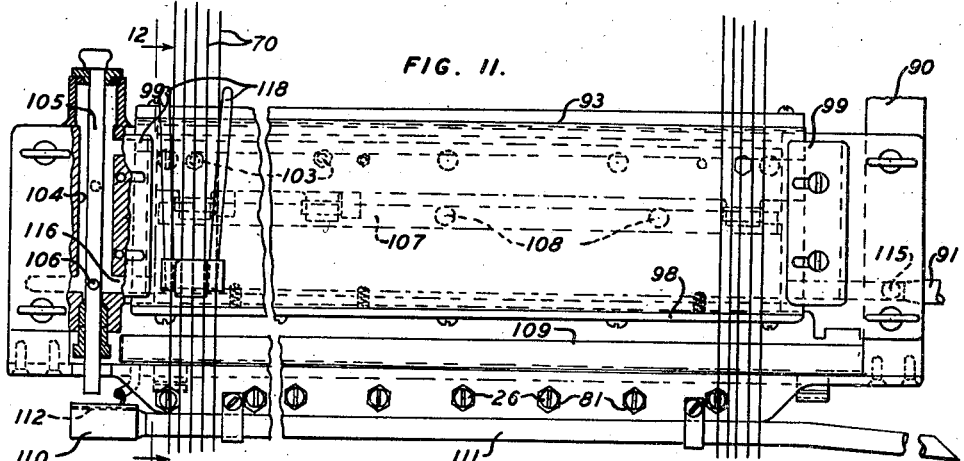
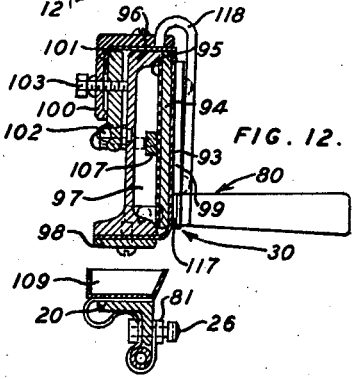
INVENTORS
E. E. NEWTON
H. P. RAY
BY E.R. Nowlan
ATTORNEY

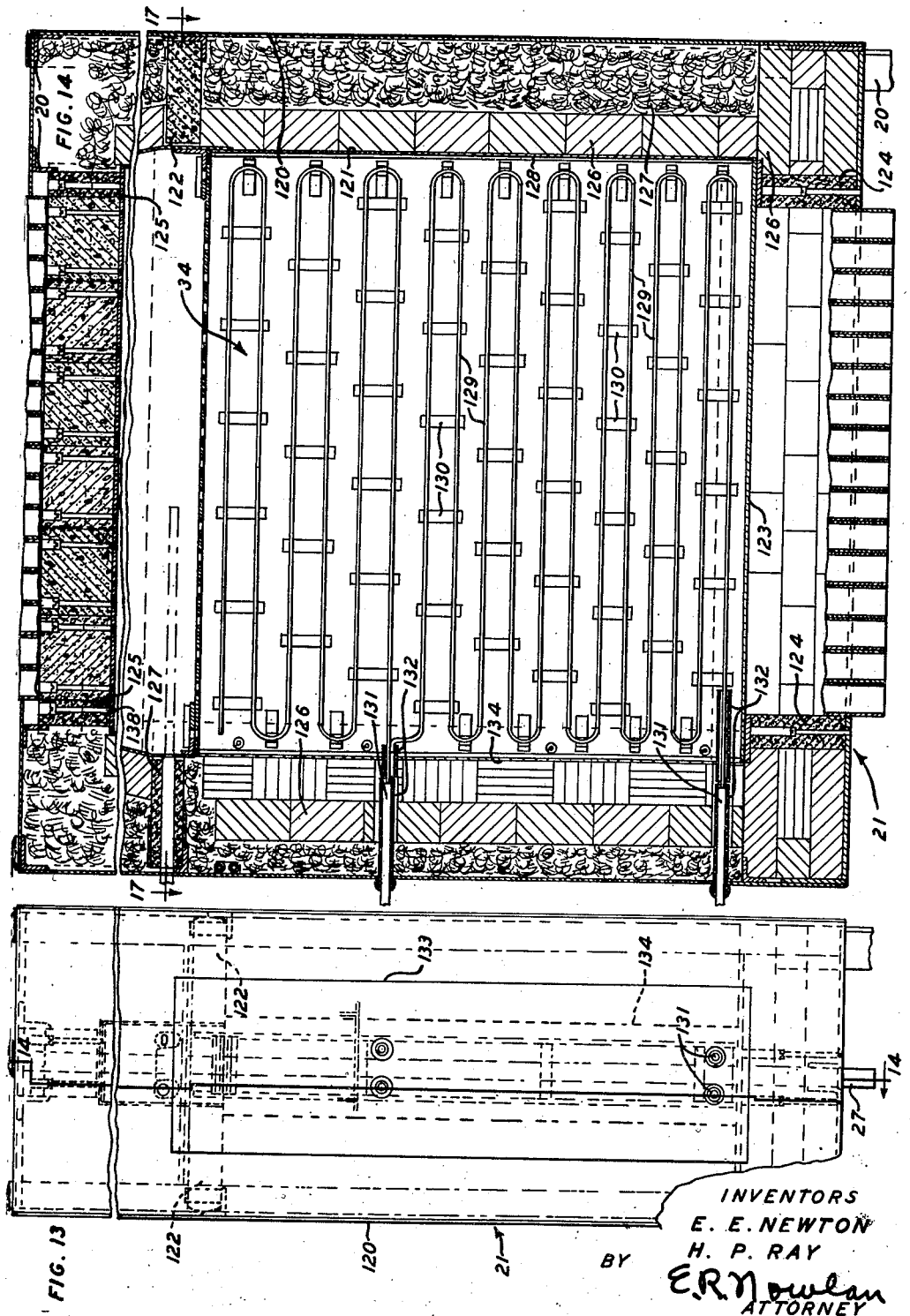

March 3, 1936.　　　E. E. NEWTON ET AL　　　2,032,950
APPARATUS FOR HANDLING STRANDS
Filed Dec. 22, 1932　　12 Sheets-Sheet 7
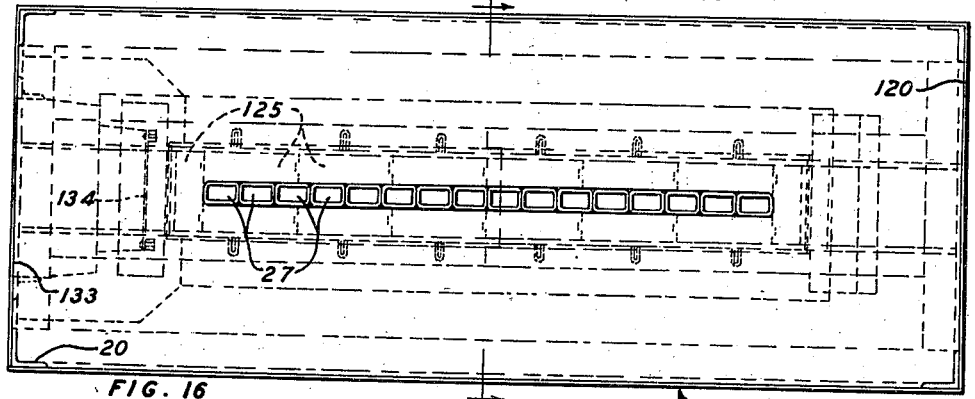
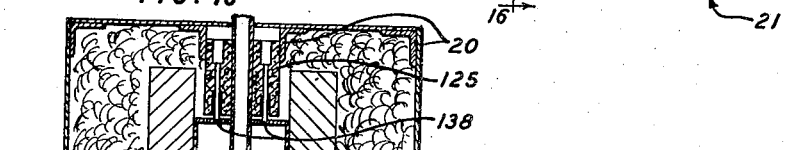
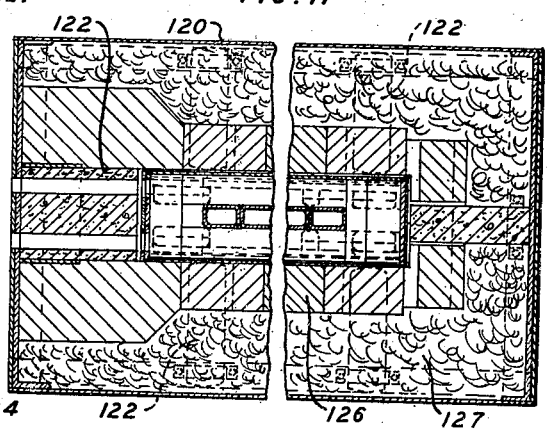
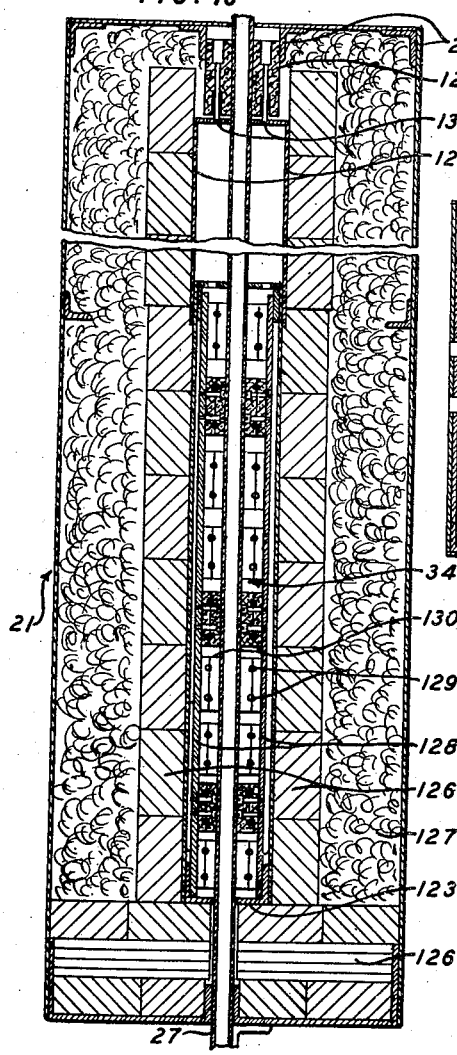
INVENTORS
E. E. NEWTON
H. P. RAY
BY E. R. Nowlan
ATTORNEY

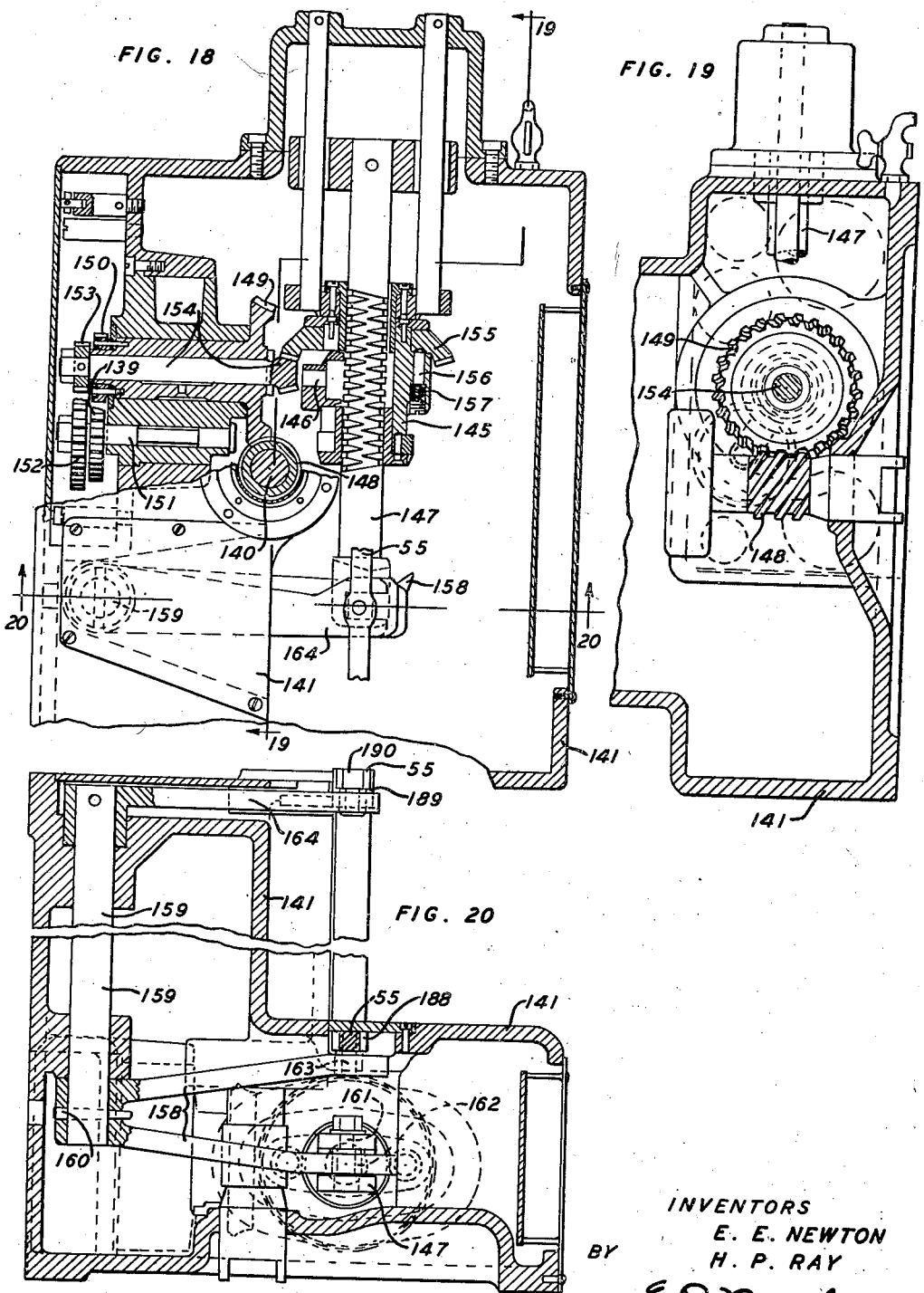

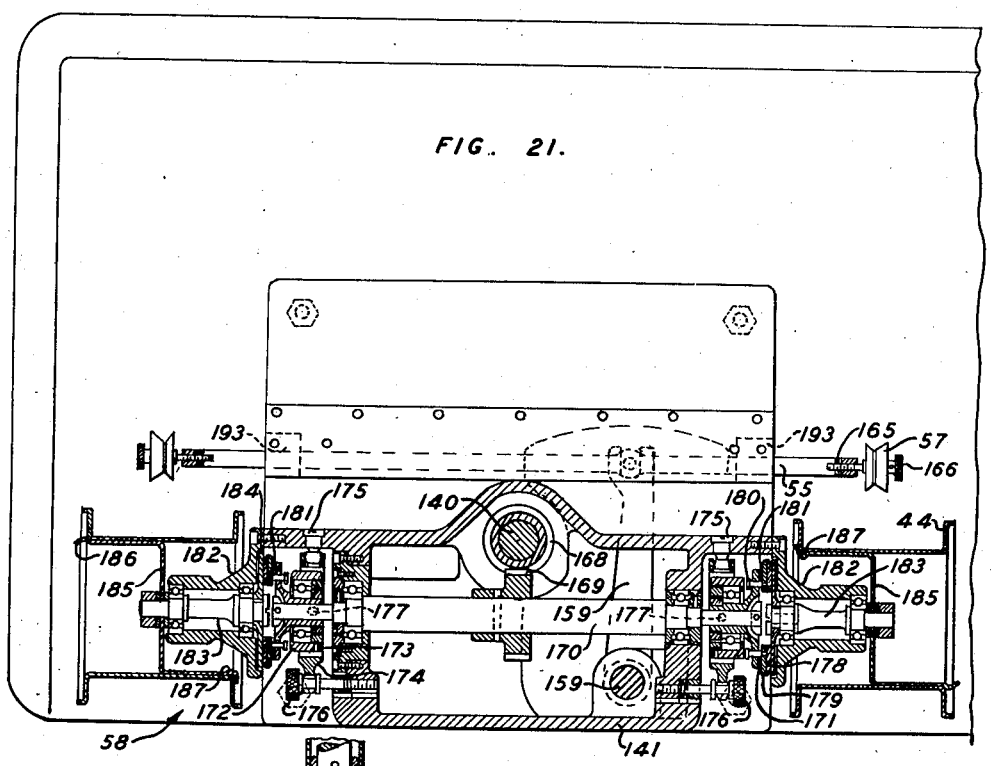
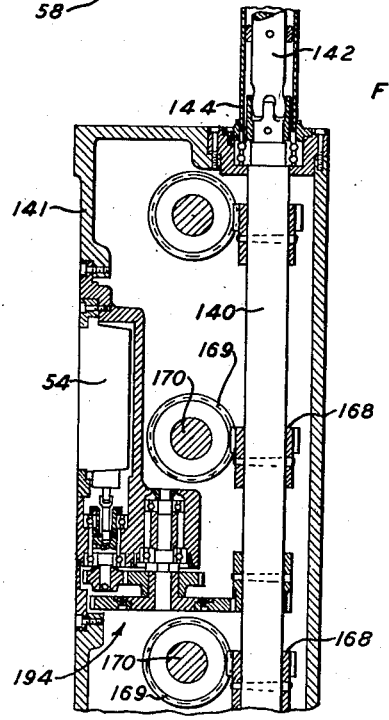

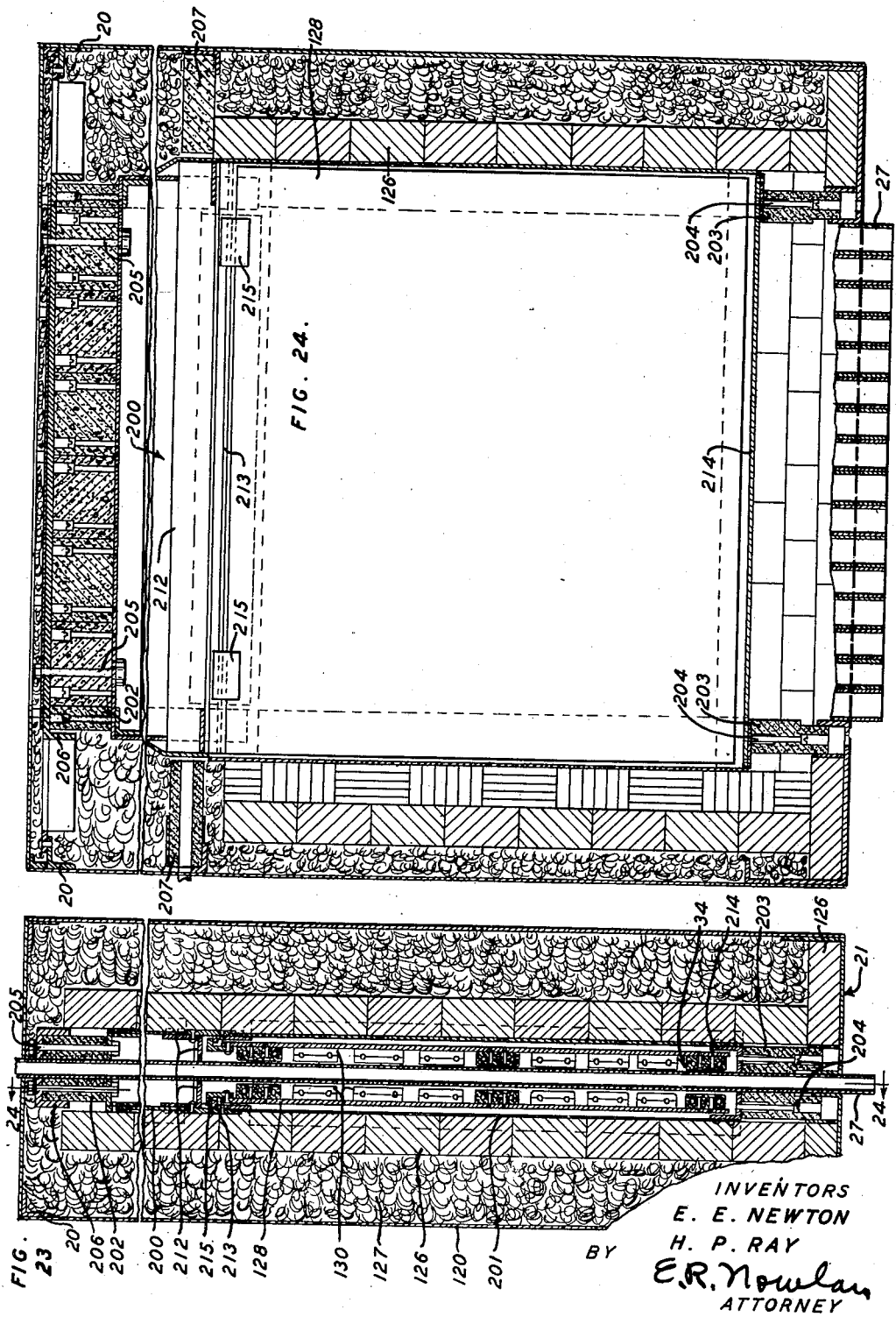

March 3, 1936.  E. E. NEWTON ET AL  2,032,950
APPARATUS FOR HANDLING STRANDS
Filed Dec. 22, 1932   12 Sheets-Sheet 11
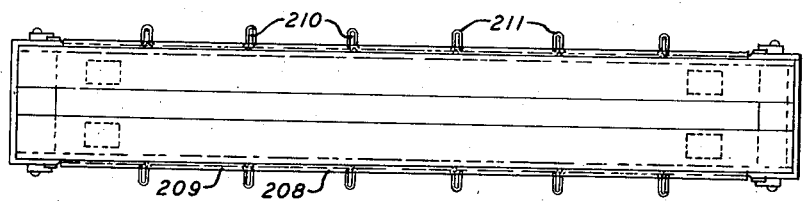
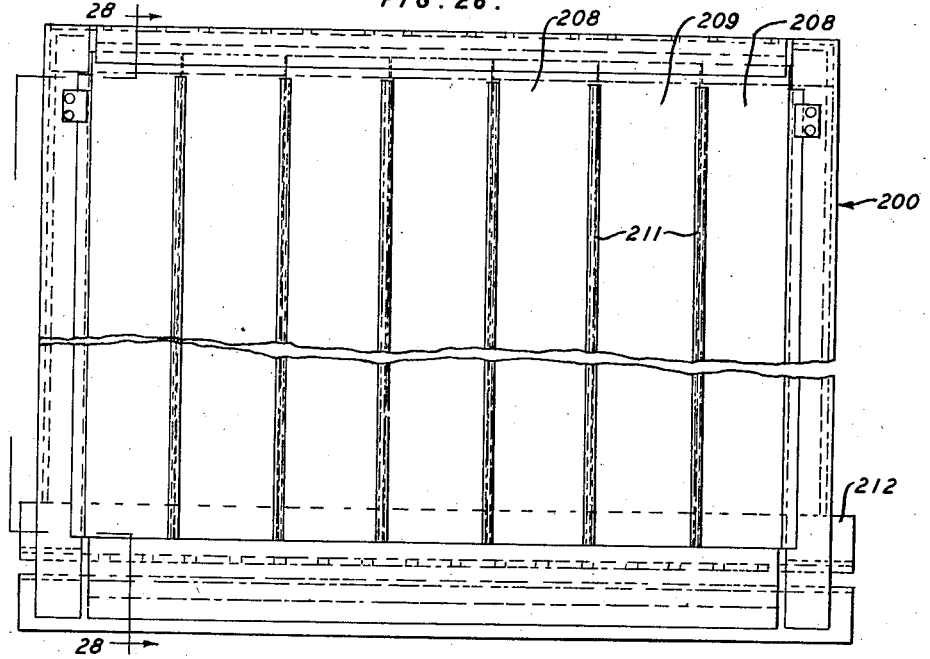
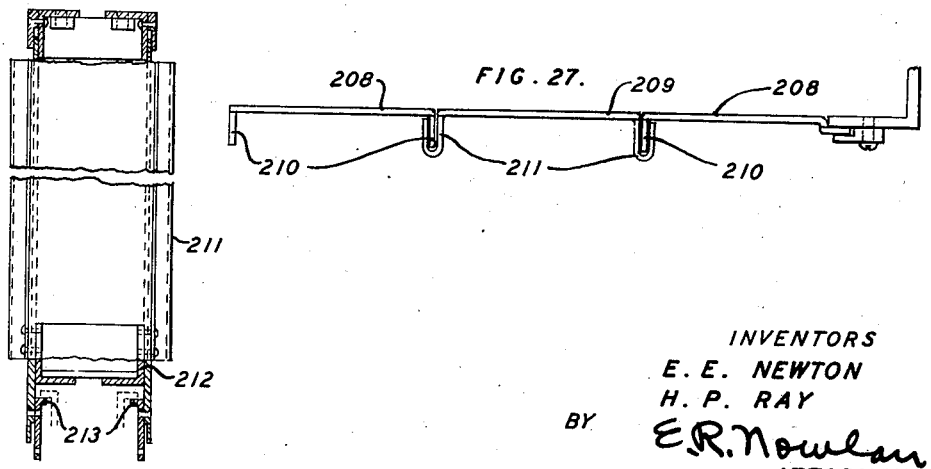
INVENTORS
E. E. NEWTON
H. P. RAY
BY E. R. Nowlan
ATTORNEY

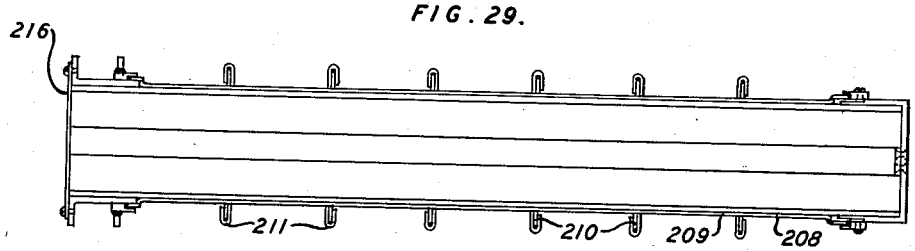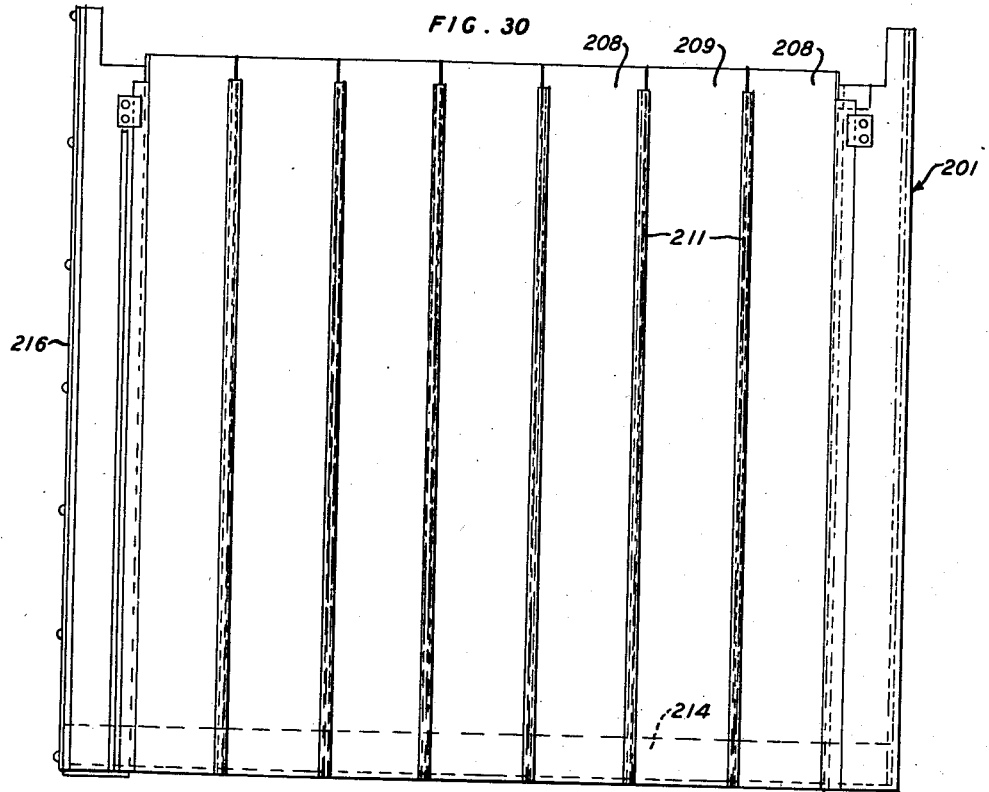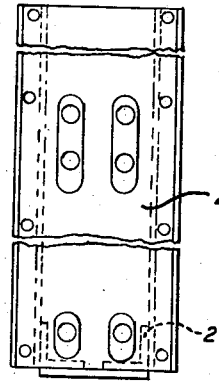

Patented Mar. 3, 1936

2,032,950

UNITED STATES PATENT OFFICE 2,032,950

APPARATUS FOR HANDLING STRANDS

Edwin E. Newton, Montreal, Quebec, and Hugh P. Ray, Mount Royal, Quebec, Canada, assignors to Western Electric Company, Incorporated, New York, N. Y., a corporation of New York Application December 22, 1932, Serial No. 648,414

11 Claims. (Cl. 91—39)

The invention relates to an apparatus for handling strands, and more particularly to an apparatus for applying an insulating enamel coating to an electrical conductor in wire form.

The invention is particularly applicable to an apparatus wherein wire is drawn from a supply spool, an enameling compound is applied a plurality of times and the wire is drawn through a baking oven a corresponding number of times to harden the enamel coatings, after which the enameled wire passes over a capstan which draws it at the desired speed through the apparatus and from which it passes to a take-up spool.

Objects of the invention are to provide an improved apparatus for handling strands, and to provide an improved apparatus for uniformly coating the strands rapidly and efficiently with a minimum amount of manual labor.

In accordance with a preferred embodiment of the invention, the enamel coatings are applied to the wires by drawing the wires across the face of a pad saturated with enameling compound. Wires to be enameled are supplied to the apparatus from a plurality of supply spools mounted on vertical axes and carried by a common vertically supporting framework. The wires are led by suitable guide means to idler sheaves, around lower rotatable multiple grooved pulleys, across the face of a pad saturated with an enameling compound, through a baking oven where the coatings of enamel are baked on the wire, around upper rotatable multiple grooved pulleys, and over a capstan to a plurality of take-up spools, upon which they are wound. Individual friction drives which are designed to allow for the difference in effective diameter between an empty spool and a full spool are employed to rotate the take-up spools. Each of the wires passes rapidly a number of times through vertically extending tubes in the oven, the tubes being located between electrical heating elements of special construction which maintain a very high temperature within the tubes. Special heat insulating means to prevent heat losses are provided and the oven is constructed to allow for the expansion and contraction of the parts thereof while it is being heated and cooled.

Other objects and advantages of the invention will more fully appear from the following detailed description and accompanying drawings, in which, Fig. 1 is a side elevation of a strand coating apparatus embodying the invention;

Fig. 2 is an elevation of the inner end of the take-up unit taken along the line 2—2 of Fig. 1;

Fig. 3 is an elevational view, partially in section, of a supply spool holder;

Fig. 4 is a plan view of the supply spool holder;

Fig. 5 is an elevational view of the friction driving device for the supply spool partially in cross section;

Fig. 6 is a plan view partially in section of the guide hook and idler sheave employed with the supply spool;

Fig. 8 is an enlarged side view of the lower portion of the enamel coating unit shown in Fig. 1;

Fig. 9 is an end view of the portion of the enamel coating unit shown in Fig. 8;

Fig. 10 is a plan view, partially in section, of the pad for applying the enameling compound to the wire;

Fig. 11 is an elevational view, partially in section, of the pad shown in Fig. 10;

Fig. 12 is a sectional view of the pad taken along the line 12—12 of Fig. 11;

Fig. 13 is a side elevational view of the oven;

Fig. 14 is a sectional elevation of the oven taken on the line 14—14 of Fig. 13;

Fig. 15 is a plan view of the oven;

Fig. 16 is a sectional elevation of the oven taken on the line 16—16 of Fig. 15;

Fig. 17 is a sectional plan view of the oven taken on the line 17—17 of Fig. 14;

Fig. 18 is a sectional plan view of a portion of the take-up unit taken on the line 18—18 of Fig. 1;

Fig. 19 is a sectional elevation of a portion of the take-up unit taken on the line 19—19 of Fig. 18;

Fig. 20 is a sectional elevation of a portion of the take-up unit taken on the line 20—20 of Fig. 18;

Fig. 21 is a sectional plan view of another section of the take-up unit taken on the line 21—21 of Fig. 2;

Fig. 22 is a sectional elevation of a portion of the take-up unit taken on the line 22—22 of Fig. 2;

Fig. 23 is a sectional elevation of another embodiment of an oven through one of the tubes;

Fig. 24 is a sectional elevation of the oven taken along the line 24—24 of Fig. 23;

Fig. 25 is a plan view of the inner walls of the upper portion of the oven shown in Fig. 23;

Fig. 26 is an elevational view of one of the inner side walls of the upper portion of the oven shown in Fig. 23;

Fig. 27 is an enlarged detailed view of the plates shown in Fig. 26 which make up the inner walls of the oven;

Fig. 28 is an end view partially in section taken along the line 28 of Fig. 26;

Fig. 29 is a plan view of the inner walls of the lower section of the oven shown in Fig. 23;

Fig. 30 is an elevational view of the side of the lower section of the inner walls shown in Fig. 23, and Fig. 31 is an elevational view of one end of the lower section of inner walls shown in Fig. 23.

Figure 7:
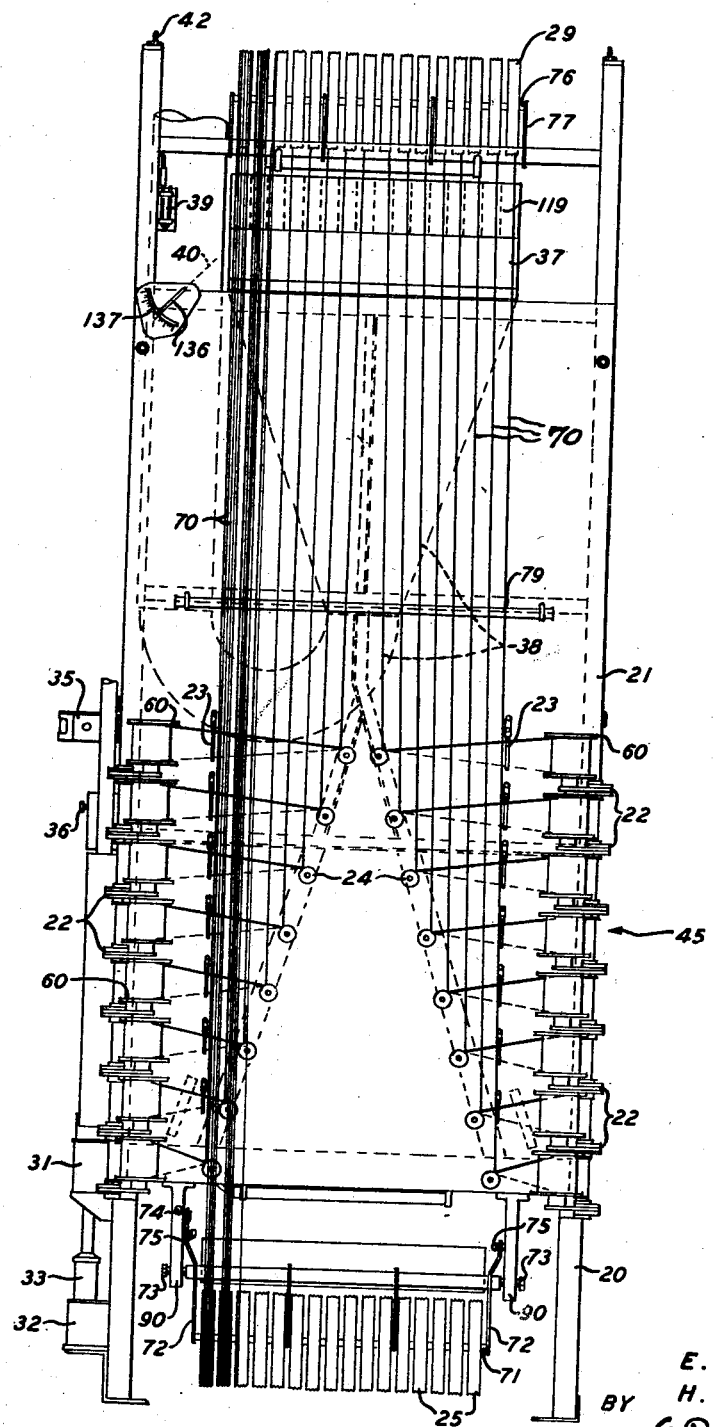
Fig. 7 is an elevation of the inner end of the strand coating unit taken on the line 7—7 of Fig. 1.

In accordance with a preferred embodiment of the invention as shown on the drawings, wherein similar parts are similarly designated throughout the various views, and wherein the general construction of the apparatus as shown in Figs. 1, 2 and 7, comprises an enamel coating unit designated generally at 45 (Figs. 1 and 7) and a take-up unit designated generally at 46 (Figs. 1 and 2).

The enamel coating unit 45 comprises a framework designated generally at 20 which supports an oven 21 including a heating unit 34, a plurality of supply spool brackets 22, an equal number of U-shaped guide hooks 23, and equal number of idler sheaves 24, and equal number of independently rotatable multiple grooved pulleys 25 below the oven 21, an equal number of independently rotatable multiple grooved pulleys 29 above the oven, a pad designated generally at 30, an enameling compound supply tank 31, an enameling compound drainage tank 32, an enameling compound pump 33, a temperature indicating device 35, a temperature control device 36, an exhaust hood 37, and exhaust condenser 38, an exhaust manometer 39, and an exhaust damper 40.

The take-up unit 46 comprises a box shaped base 50 which supports a motor 51, motor speed control means comprising a rheostat 52, and motor switching means 53, a speed indicating device 54, a traverse frame 55 having a plurality of traverse guide pulleys 57 therein, and an equal number of frictional drives 58 for take-up spools 44 and a capstan 56. The traverse frame 55 comprises a lower horizontal member, an upper horizontal member and substantially vertical side members connecting the horizontal members, the guide pulleys 57 being secured to the side members. The capstan 56 comprises a steel cylinder of large diameter with a thick soft rubber cover which provides sufficient friction to prevent slipping of the wires 70 by merely passing them over the top. Frame 20 and box shaped base 50 mutually support and are connected by a platform 41 and a pair of braces 42. A mandrel 43 is supported by the pair of braces 42.

The supply spool brackets 22 (Figs. 1, 3, 4 and 7) which support the supply spools 60 are mounted in two columns on the framework 20 at the inner end of the enamel coating unit 45 on one side of the oven 21 so that the axes of the spool in each column are in a common vertical plane. Each of the supply spool brackets 22 includes a drum 61 (Figs. 3, 4 and 5) upon which the supply spool 60 is assembled. The drum 61 is mounted on a vertical stud shaft 62 which shaft is journalled in a housing 63 on an arm 64 pivoted at 78. This construction permits movement of the supply spool drum 61 and the spool 60 from the normal position shown in full lines in Fig. 4 to the position shown in dotted lines at the left of Fig. 4.

To prevent the supply spools 60 from overrunning, suitable friction means are provided. These friction means comprise a pliable felt friction ring 65 which bears on the lower surface of the drum 61, a stationary metallic friction ring 66 which bears against the lower surface of the felt friction ring 65, and a spring ring 67 which bears against the lower surface of the metallic ring 66. The metallic ring 66 and spring ring 67 are slidably keyed in the housing 63 to prevent the rotation of these two rings with respect to the housing 63. An adjusting screw 68 is provided so that the pressure of a bifurcated lever 69 against the spring ring 67 can be controlled to regulate the pressure on the felt ring 65 located between the rotary drum 61 and the stationary metallic ring 66.

Multiple grooved pulleys 25 of a relatively large diameter, made of an aluminum alloy, and independently rotatable on a shaft 71 mounted in a rotatable frame 72, are provided at the lower inner end of the enamel coating unit, and, similar multiple grooved pulleys 29 of a relatively large diameter, made of an aluminum alloy, and independently rotatable on a shaft 76 mounted in a fixed frame 77, are provided at the upper inner end of the enamel coating unit vertically above the lower pulleys 25. The fixed frame 77 is supported by the framework 20 and the rotatable frame 72 (Figs. 8 and 9) is fulcrumed on pad brackets 90 by means of two pivot screws 73.

An adjusting screw 74 mounted in one of the pad brackets 90 controls the position of the rotatable frame 72 and the pulleys thereon to the right or left as viewed in Fig. 8. Two wing screws 75 are provided to lock the rotatable frame 72 in its desired position. This adjustment permits varying the pressure of the wires 70 on the pad 30, which in practice will vary from practically no pressure to about 25 ounces, depending on the size of the wire being enameled.

Each of the pulleys 25 and 29 are provided with a plurality of peripheral grooves, one for each pass of wire, as additional coats of enamel are applied. The diameter of the peripheral grooves in each of the pulleys 25 and 29 are slightly larger in order of sequence of the portions of wires 70 passing over them.

Individual guide hooks 23 (Figs. 6 and 7) are provided to guide the wires 70 as they pass from the supply spools 60 to the idler sheaves 24. The guide hooks 23 and idler sheaves 24 are mounted on the framework 20 and are arranged to guide the wire from the supply spools 60 transversely behind and out of engagement with the vertical moving portions of the wires 70.

A glass bar 79 (Figs. 1 and 7) is provided above the guide hooks 23 to prevent the portions of the wires 70 which are moving downward on the outside of the oven 21 from vibrating to an extent which would permit them to come in contact with the outer wall of the oven 21.

A pad designated generally at 30 (Figs. 1, 8 and 9) is mounted on the pair of pad brackets 90 by means of wing screws 114. The pad 30 comprises a pad face 93 (Figs. 10, 11 and 12) formed of thin pliable porous felt, a pad backing 94 formed of a thicker piece of pliable porous felt, a perforated metal plate 95, a pad holder 96, clamp plates 98, 99 and 100, a stretching plate 101, and a metal bar 107. The pad holder 96 is shaped so that when the perforated metal plate 95 and pad backing 94 are assembled on the pad holder 96, a recess or reservoir 97 is provided between the central portion of the pad holder 96 and the perforated metal plate 95. The pad face 93 is secured to the pad holder 96 by the clamp plate 98 located at the bottom of the pad holder 96, clamp plates 99 located at the sides of the pad holder 96, clamp plate 100 and stretching plate 101 located at the top of the pad holder 96. The stretching plate 101 is fulcrumed about the lugs 102 secured to the rear side of the pad holder 96. Adjusting screws 103 are provided to move the stretching plate 101 in order to stretch the pad face 93. One of the pad brackets 90 has a passage 115 which connects a line of piping 91 with the recess or reservoir 97 between the pad holder 96 and the perforated plate 95. The enameling compound flowing in the line of piping 91 passes through the passage 115 in the pad bracket 90, into the recess or reservoir 97 between the pad holder 96 and perforated metal plate 95, and through the perforations in the metal plate 95, maintaining a predetermined level of the compound in the recess 97 and thereby saturating the outer surface of the pad face 93 with enameling compound which filters through the felt pad backing 94 and felt pad face 93 slowly and constantly.

A metal bar 107 (Figs. 10, 11 and 12) is positioned in the recess 97 against the perforated plate 95 approximately midway against the top and bottom of the plate 95 (Fig. 11). Adjusting screws 108 in the pad holder 96 bear against the metal bar 107. When the adjusting screws 108 are tightened the metal bar 107 springs the perforated plate 95 outward at the center thereof and changes the surfaces of the perforated plate 95, the pad backing 94 and pad face 93 from plane surfaces to cylindrical surfaces.

An enameling compound supply tank 31 (Figs. 1, 8 and 9), which is connected through a control valve 92 to the line of piping 91, is supported by the framework 20. The supply tank 31 has a lid 82 upon which lid is mounted an upper compartment 83. A strainer 84 formed of a fine mesh wire screening covers an aperture in the lid 82. A bracket 85 is secured to the under side of the lid 82. A float 87 having associated therewith a stem 86 and knob 88 is assembled in the bracket 85 with the stem 86 and knob 88 projecting above the lid 82 to indicate the level of the enameling compound in the tank 31. A drain valve 89 is located in the bottom of the tank 31.

At the end of the pad 30 remote from the passage 115 an overflow chamber 104 (Fig. 11) is provided and a passage 116 leads from the recess 97 to the overflow chamber 104. An overflow tube 105 is slidably mounted in the pad holder 96 and has an opening 106 communicating with the overflow chamber 104. The height of the enameling compound in the recess 97 and the resultant amount of saturation of the pad backing 94 and pad face 93 is controlled by adjusting the height at which the opening 106 is made in the tube 105 and adjusting the height of the tube 105 with respect to the overflow chamber 104.

The design of the pad 30 permits it to be used with the pad face 93 straight and parallel with the wires 70, so that they are in contact with the entire face of the pad, with the central portion of the pad bulged out by the bar 107, so that the wires 70 are in contact with only the central portion thereof, or with the upper portion of the pad face extending farther forward than the lower portion or vice versa, by placing shims in back of the upper or lower portions of the clamp plates 99. In this manner, the design of the pad 30 permits any desired adjustment.

The amount of enamel picked up by the moving wires 70 from the pad 30 depends upon four things: First, the amount of pressure of the wires 70 on the pad face 93, which is determined by the adjustment of the pulleys 25; second, by the level of the compound in the recess 97 which is determined by the adjustment of the height of the opening 106 in the overflow tube 105; third, by the curvature of the pad face 93 which is determined by the adjustment of adjusting screws 108 or by the angle between the face of the pad and the wires 70; and, fourth, by the character of an amount of solvent used with the enamel employed.

The material which drips from the pad 30 is caught by a drip pan 109 extending under pad 30 from which it drains into an overflow pan 110 into which pan 110 the enamel from the overflow tube 105 also drains. The enamel from pan 110 passes through drain tube 111 into drainage tank 32. A fine wire mesh screen 112 covering the pan 110 and a glass cover 113 (Fig. 9) covering the drainage tank 32 serve to keep foreign matter, such as flies and other insects from clogging the system. A hand pump 33 (Fig. 7) is employed when required, as will be indicated by the float knob 88 (Fig. 8) to elevate the enameling compound from drainage tank 32 to the supply tank 31.

It has been found, in embodiments constructed and operated in which the pad face 93 was between two and four inches high, considerably less solvent is required in the enamel than when the enamel is applied to a wire by running it through a tank and that the wiping action of the pad 30 enables each coating of enamel to flow evenly about the wire and also be properly baked thereon in a much shorter time and thereby permits increasing the speed of the wire through the apparatus.

Supported on the framework 20 and mounted directly beneath the pad 30 in the vertical plane of the roots of the first pass grooves in pulleys 25 are adjustable screws 26 (Figs. 8, 9, 11 and 12), each having a slot in the head thereof. When it is desired to have the first pass of each of the wires 70 travel through the tubes 27 of the oven 21 without an enamel coating, the slots in the adjustable screws 26 are adjusted so that they are vertical and with the roots of the slots in a vertical plane parallel to and to the left of a vertical plane tangential to the pad face 93 of the pad 30, as viewed in Figs. 1 and 8. The first pass of each of the wires 70 is run in the slot of the adjustable screw 26 to keep it out of contact with the pad face 93 of the pad 30. The heat in the tubes 27 will then burn off any grease, copper particles or other foreign substances which may be on the bare wires 70 to be enameled, and will also thoroughly anneal copper wire before the first coat of enamel is applied. When desired the first pass of the wires 70 through the tubes 27 can be given a coating of enamel by setting the adjustable screws 26 so that they do not contact with the wires 70 as they pass from the pulley 25 to the pad 30. Lock nuts 81 are provided to lock the adjustable screws 26 in the desired positions.

An auxiliary pad 80 (Figs. 10, 11 and 12) having a pliable felt face 117, is provided for use with the larger sizes of wire to facilitate rapid and thorough application of enamel on the wires 70. In an embodiment successfully operated the auxiliary pad 80 was designed to be readily removable from the pad 30 and to rest against the wires 70 with a pressure of about 25 ounces. The height of the felt face 117 with respect to the face 93 of the main pad 30 is readily adjustable by changing the height of the face 117 with respect to the upper portions of the arms 118.

The framework 20 supports the oven 21 which is provided with apertures at the top and bottom through which rectangular tubes 27 (Figs. 13, 14, 15, 16 and 17) formed from round heavy nickel tubes, extend. The oven 21 comprises outer walls 120 and inner walls 121, spaced from each other by insulating spacing blocks 122 of lavite. At the bottom of the oven the rectangular tubes 27 are fixed to the framework 20 and, to allow for expansion and contraction, the tubes 27 are otherwise slidably mounted. Inserted in slots at the bottom of each tube 27 are a pair of slidable dampers 28 to limit the amount of air ascending in the tube 27 and to permit adjusting the opening to the right or left (Fig. 8) as required. The inner walls 121 are supported by a slotted plate 123 (Figs. 14 and 16) which rest upon heat insulating supporting blocks 124 of lavite. Expansion of the inner walls 121 is provided for at the top of the oven 21 by heat insulating sliding blocks 125 of lavite which surround the tubes 27 and are slidably mounted in the framework 20. Between the inner walls 121 and the outer walls 120, heat insulating material is provided. The heat insulating brickwork 126 is positioned against the inner walls 121 and heat insulating material such as rockwool 127 is positioned between the insulating brickwork 126 and the outer walls 120.

To facilitate the rapid cooling of the wires 70 after they leave the oven 21 and before they reach the upper pulley 29, it was found desirable, especially in the case of wires of large diameter, to provide auxiliary cooling means. A plurality of tube-like members 119 of the same internal dimensions as the tubes 27 with their lower ends connected to the exhaust hood 37, to provide a down-draft through the tube-like members 119, were found satisfactory for this purpose.

The heating unit 34 is positioned at the lower portion of the oven. The heating unit 34 comprises two heavy nickel plates 128 (Figs. 14 and 16), one in front of and one in back of the rectangular tubes 27. Suitable resistance wires 129 are mounted on the plates 128 and are insulated therefrom and from the tubes 27 by means of insulators 130 of lavite, which insulators are mounted on the plates 128. The ends of the resistance wires 129 are welded to low resistance copper terminal rods 131 to which the electrical connections from the source of supply are made. Porcelain insulators 132 insulate the resistance wires 129 and terminal rods 131 from the inner and outer walls of the oven and from the heat insulating materials. The heating units 34 and oven 21 are designed to produce a temperature of approximately 1300° Fahrenheit within the tubes 27 approximately midway between the top and bottom of the tube. The tubes 27 and plates 128 are made of pure nickel which will not flake at the temperatures employed. To permit the making of repairs on the heating unit, the side of the oven 21 from which the heating unit terminals 131 protrude is provided with removable outer wall plates 133 and removable inner wall plates 134. Blocks 124 and 125 are held in place by means of screws 138 seated in recesses formed in the blocks and threaded into the walls of the oven, the recesses forming heat insulating dead air spaces.

In a particular embodiment constructed and found satisfactory, each of the sixteen rectangular nickel tubes 27 was approximately 100 inches long, with an opening approximately 1⅜ inches by ⅞ inch therein, and a wall thickness of approximately .125 inch. The nickel plates 128 of the heating unit 34 were approximately .312 inch thick.

With an oven constructed as described above and a temperature of approximately 1300° Fahrenheit in the tubes midway between the ends thereof, and the use of a relatively thick enamel applied by means of the pad above described, it has been found possible to run No. 33 gauge wire through the apparatus at approximately 135 feet per minute, which speed is approximately three times that formerly found practicable.

The solvents in the enameling compound which are driven off the coated wires 70 by the heat in the tubes 27 are drawn from the tops of the rectangular tubes 27 into an exhaust hood 37 which is connected through an exhaust condenser 38 to an exhaust system equipped with a suction fan (not shown). The exhaust condenser 38 is provided with removable plates 135 (Fig. 1) to facilitate removing the condensate as required. An exhaust damper 41 having a stem extension 136 which indicates the setting thereof on a scale 137 (Fig. 7) is employed to regulate the pressure difference between the atmosphere and the gases in the exhaust condenser 38 as indicated on the manometer 39.

The first portions of the wires 70 pass upward from the pad 30, through the rectangular tubes 27, over the pulleys 29, and downward on the outside of the oven 21 to the lower pulleys 25. The last portions of wires 70 pass upward through the tubes 27 of the oven 21, over the pulleys 29, under the mandrel 43 (Fig. 1) and over the capstan 56. The mandrel 43 has a plurality of peripheral grooves equal in number to the number of pulleys 29 and is adapted to form a member to which loose ends of wire may be attached when threading the wires 70 through the machine or when one of the wires breaks during the operation of the machine.

The base 50 houses the vertical motor 51, motor switch 53 and rheostat 52 for controlling the motor speed. On the produced axis of the motor shaft and driven at the motor speed are two shafts 140 (Figs. 18, 21 and 22) and 142 (Fig. 22). The shaft 140 is flexibly coupled to the motor 51 and extends to the height of the compartment or box 141. The shaft 140 is coupled at its upper extremity to the shaft 142 which later shaft extends to a capstan housing 143 (Fig. 1) within which housing suitable gearing is provided to drive the capstan 56. The shaft 142 is housed in a tube 144 (Figs. 1 and 22).

Suitable gearing, indicated generally at 194 (Fig. 22) is provided in the box or compartment 141 to drive the speed indicating device 54 from shaft 140.

In the lower portion of the compartment or box 141, a sleeve 145 (Fig. 18) houses a pawl 146 which engages with the right and left hand screw of a non-rotatable traverse bar 147. The sleeve 145 is driven from the shaft 140 through a worm 148, a worm gear and sleeve integral therewith 149, gears 150 and 139, shaft 151, change gears 152 and 153, a shaft and bevel pinion 154 integral therewith, bevel gear 155 and a spring pin 156. If the pawl 146 becomes jammed on a diamond point of the right and left hand screw of the traverse bar 147, the torque of the bevel gear 155 will overcome the pressure of a spring 157 causing the spring pin 156 to recede from a drilled spot recess in bevel gear 155, which permits the bevel gear 155 to rotate without introducing dangerous stresses in any of the parts. The pitch of the traverse mechanism, to accommodate the different sizes of wires being coated, is changed by changing change gears 152 and 153.

One end of the traverse bar 147 is connected to one arm of a bifurcated lever 158 (Figs. 18 and 20) by means of a screw 161 and a square block 162 which is assembled in a slot in the arm of the lever 158. The movement of the traverse bar 147 in and out, as viewed in Fig. 20, imparts first a clockwise and then a counterclockwise motion to a vertical bar 159 which is secured to the bifurcated lever 158 by means of a taper pin 160. The upper arm of the bifurcated lever 158 is fastened to the bottom of the traverse frame 55 (Fig. 20) through a square block 188 and a stud 163 secured to the traverse frame 55 and imparts an oscillatory motion to the traverse frame 55. The bar 159 imparts the same motion to the top of the traverse frame 55 through a single lever 164 (Figs. 18 and 20) a square block 189 and a stud 190. Suitable glides 192 and 193 (Figs. 2 and 21) at the top and bottom respectively of box 141 maintain a straight line motion of the traverse frame 55 as it oscillates.

Threaded into the frame 55 (Fig. 21) and extending through a plurality of flat springs 165 are a plurality of adjusting screws 166 on each of which is rotatably mounted a sheave 57. The adjusting screws 166 are set to bring the sheaves 57 into correct registry with the take-up spools 44 so that the wires 70 may be laid evenly on the take-up spools 44. The flat springs 165 impart pressure endwise of the screw 166 to preserve its adjustment.

Pinned to the vertical shaft 140 (Fig. 21) are a plurality of spiral gears 168 meshing with an equal number of spiral gears 169 which are secured to an equal number of horizontal shafts 170. The friction drives 58 are secured to each end of the shafts 170 and each is constructed as follows: Slidably keyed to the shaft 170 is a sleeve 171 the outer side of which is secured to the inner race of a ball bearing 172. The outer race of the ball bearing 172 is fixed in ring 173. A ring shaped yoke 174 with a cylindrical projection on one side and a forked projection diametrically opposite to the cylindrical projection surrounds the ring 173. A fulcrum screw 175 extends through and is secured in a projection from the compartment or box 141. The screw 175 extends into the cylindrical projection of the ring shaped yoke 174. A double collar screw 176 is assembled in the forked projection of the yoke 174 and is threaded into the compartment or box 141. Two pivot screws 177 are secured in the ring portion of the yoke 174 on a diameter normal to the plane of the axis of shaft 170 and screws 175 and 176. The pivot screws 177 pivot in diametrically opposite holes in the ring 173. When the screw 176 is turned, the ring shaped yoke 174 is rocked about the fulcrum screw 175 and by means of the pivot screws 177, ring 173, and ball bearing 172, a movement is imparted to the sleeve 171 longitudinally to the shaft 170.

A soft felt friction ring 178 is secured to a metal ring 179 which ring 179 is slidably mounted on sleeve 171 by means of three headed pins 180. A corrugated spring ring 181 is located between ring 179 and sleeve 171 and surrounds the three pins 180. A bracket 182 is secured to the projection from the compartment or box 141 and houses a shaft 183 having its axis in line with shaft 170. A friction disc 184 is secured to the inner end of the shaft 183, and a spool holder 185 is secured to the outer end of the shaft 183. When the yoke 174 is rocked toward the take-up spool 44 the sleeve 171 slides in the same direction and compresses the spring ring 181. This increases the pressure between the driving friction ring 178 and the driven friction disc 184. The driving friction ring 178 is rotated at all times a little faster than the maximum desired speed for the spool 44 and driven disc 184 but the rotation of the spool is retarded by the tension of the wire 70 between the capstan 56 and the spool 44. Therefore, regardless of the diameter of the spooled wire upon the spool 44, the spool 44 will rotate only as fast as is permitted by the delivery of wire from the capstan 56 and the tension in the wire 70 is regulated by the pressure between the friction surfaces. The rotation of the spool 44 may be stopped by disengaging the friction surfaces.

The spool holder 185 is formed from a sheet of spring steel and has a body in the shape of a ring with six equally spaced radial arms extending therefrom. Three alternate arms extend outward and are formed to have an embossment on the end thereof as shown at 186 and the other three extend inward and are formed to have a shoulder on the end thereof as shown at 187. The sheet steel from which the spool holder 185 is formed is of sufficient thickness to insure proper spring in the arms 186 to permit sliding a take-up spool 44 over the embossments at the end of the arms 186, and when the spool 44 is in its normal position against the shoulder of the arm 187 to provide sufficient spring pressure against the inside of the spool drum of the take-up spool 44 to drive it.

The machine as disclosed is capable of simultaneously enameling sixteen individual strands of wire 70. In the operation of the machine each of the wires 70 to be coated is fed from a supply spool 60 and passes in an approximately horizontal direction through a U-shaped guide hook 23 and over an idler sheave 24, downward to the groove on the left side of a rotatable multiple grooved pulley 25 and around the pulley, upward through the slot in an adjustable screw 26 through a vertical tube 27 in the oven 21 (to properly anneal the wire and burn off any foreign substances that may be thereon), to the groove on the left side of a rotatable multiple grooved pulley 29 and around the pulley, downward on the outside of the oven 21 to the next groove in the pulley 25 and around the pulley, upward in contact with the saturated pad face 93 of the pad 30 (to receive the first coat of enamel), through the tube 27 (where the enamel coating just applied is thoroughly baked onto the wire), to the next groove in pulley 29, from which the wire 70 passes several more times around the pulleys 25 and 29, contacts with the pad face 93 and passes through the tube 27 of the oven 21.

After the last pass of the wire 70 passes through the tube 27, the wire 70 passes over the groove on the right side of pulley 29 and in an approximately horizontal direction, under the mandrel 43 to the rubber covered capstan 56, over the capstan 56 and downward over a guide pulley 57 to a take-up spool 44.

The amount of enamel picked up by the wire 70 as it passes over the pad face 93 is adjusted by controlling the position of pulleys 25, controlling the level of the enameling compound in the reservoir 97 and controlling the curvature of the pad face 93. The tension on the wire 70 is controlled by regulating the adjusting screw 68 which controls the friction on the supply spool 60 and by regulating the adjusting screw 176 which controls the friction on the drive 58 of the take-up spool 44. The desired pitch of the traverse frame 55 is obtained by inserting the proper change gears 152 and 153. The draft within the individual tubes 27 of the oven 21 is controlled by adjusting the sliding dampers 28 and the exhaust damper 40. The oven 21 is heated and its temperature adjusted by the temperature control device 36. The motor 51 is started by operation of the starting button 53 and its speed adjusted by the control rheostat 52. The motor 51 drives the capstan 56 and oscillates the traverse frame 55 causing the wires 70 to be drawn through the apparatus.

Another preferred embodiment of the construction of the oven 21 which is supported by the framework 20 is shown in Figs. 23 to 31 inclusive. The oven is provided with apertures at the top and bottom through which the rectangular nickel tubes 27 (Fig. 23) extend. The inner walls are made in two sections, an upper section 200 and a lower section 201. All the parts of the upper and lower inner wall sections, including the screws and rivets used, are of nickel.

The upper inner wall section 200 is suspended from the upper portion of the outer wall 107 by bolts 205 which pass through a supporting member 206 and lavite insulating blocks 202. The construction of the upper section of the inner wall is shown in Figs. 25, 26, 27 and 28. The sides of the inner walls are made up of a number of heavy nickel plates 208 and 209. The plates 208 have flanges 210 projecting therefrom, and the plates 209 have U-shaped end projections 211 which are slidably fitted over the flanges 210 so that the individual plates can expand and contract lengthwise with respect to each other. The bottoms of the plates 208 and 209 are secured to members 212 and the tops of these plates are left free so that they can expand and contract without creating any undesirable stresses in the apparatus as it heats and cools.

The lower inner wall section 201, the construction of which is shown in Figs. 29, 30 and 31 is of the same height as the heating units 34. It comprises alternate plates 208 having flanges 210 and plates 209 having U-shaped sections 211. The plates are assembled in a manner similar to the plates in the upper inner wall section, the bottoms of these plates being secured to a plate 214. The lower inner wall section 201 is suspended from upper inner wall section 200 by securing the ends of the two sections together. A removable door 216 on the lower inner wall section 201 permits the rapid removal of the heating units 34 for inspection and repair. The heating units 34 are suspended from the upper section 200 by means of angle members 215 secured to the heating units 34 and members 213 secured to the upper section 200. The heating units 34 are readily assembled between the lower inner wall plates 208 and 209 and the tubes 27 by sliding them into place. Sliding blocks 203 are secured to the angle plate 214 at the bottom of the lower inner wall section 201 by means of screws 204. The lower end of the outer walls 120 are arranged to permit the blocks 203 to readily slide up and down as the various parts of the oven expand and contract.

While the invention has been described with special reference to the embodiment illustrated herein, it is to be understood that various modifications may be made therein without departing from the spirit of applicants' invention, the scope of which is defined by the appended claims.

What is claimed is:

1. A strand enamelling apparatus comprising a pad having a substantially vertical face of pliable porous material, an interior recess or reservoir in the pad for maintaining a portion of the pad face saturated with enamelling material, means for controlling the height of the coating material within the reservoir, and means for drawing a strand across the face of the pad to apply a coating of enamel to the strand.

2. In a strand coating apparatus, a pad for applying a coating to a strand by moving the strand relative to the pad comprising a perforated metal plate, a pad face of pliable porous material, a pad backing of pliable porous material between said pad face and said perforated metal plate, a pad holder arranged to form a reservoir between the perforated metal plate and the pad holder, an overflow chamber, and a slidable tube having an opening therein for regulating the height of the coating compound in the chamber.

3. In a strand coating apparatus, a pad for applying a coating to a strand having a perforated metal plate and a pad face of pliable porous material, means to move the strand over the pad face in contact therewith, and means for moving a selected portion only of the perforated plate outward toward the pad face to change the contour of the pad face.

4. A strand enamelling machine comprising a pad having a facing of pliable porous material saturated with fluid enamelling material for applying a coating of enamel to a strand moving relatively to the pad and in contact therewith, a perforated metal plate supporting the pad, a pad backing of pliable porous material interposed between the facing and the plate, a holder to hold and support the pad and the pad backing and the plate, means to adjust the position of the holder to vary the contact of the facing and the strand, and means to move the strand in contact with the facing.

5. In a pad for applying a coating to a strand by moving the strand relatively to the pad and in contact therewith, a pad facing of pliable porous material, a perforated metal plate to support the same, and means to adjustably warp the metal plate to modify the contour of the pad facing.

6. In a pad for applying a coating to a strand by moving the strand relatively to the pad and in contact therewith, a pad facing of pliable porous material, an intermediate pad backing member of pliable porous material, a perforated metal plate to support the same, and means to adjustably warp the metal plate to modify the contour of the pad facing.

7. In a pad for applying a coating to a strand by moving the strand relatively to the pad and in contact therewith, a pad facing of pliable porous material, a perforated metal plate to support the same, and means to adjustably alter the metal plate to controllably vary the contact of the facing with a strand moving thereover.

8. In a strand coating apparatus, a pad for applying a coating to a strand having a pad facing of pliable porous material and a perforated metal plate to support the same, means to move a strand over the pad and in contact therewith, and means to adjustably tilt the metal plate to controllably vary the contact of the facing with a strand moving thereover.

9. In a strand coating apparatus, a pad for applying a coating to a strand, means to move the strand over the pad in contact therewith, and means to adjustably alter the area of contact between the pad and the strand.

10. In a strand coating apparatus, a pad for applying a coating to a strand, means to move the strand over the pad in contact therewith, and means to adjustably alter the contour of the pad in contact with the strand.

11. In a strand coating apparatus, a pad for applying a coating to a strand, means to move the strand over the pad in contact therewith and means to adjustably alter the angle of the face of the pad in contact with the strand.

EDWIN E. NEWTON.
HUGH P. RAY.